United States Patent [19]

Garratt

[11] 3,778,638

[45] Dec. 11, 1973

[54] FREQUENCY-TO-VOLTAGE CONVERTER HAVING HIGH NOISE IMMUNITY

[75] Inventor: Philip M. Garratt, Amsterdam, N.Y.

[73] Assignee: General Electric Company, Schenectady, N.Y.

[22] Filed: Nov. 9, 1972

[21] Appl. No.: 304,994

[52] U.S. Cl. .................. 307/233, 307/271, 307/295, 328/140

[51] Int. Cl. .......................... H03d 13/00, H03k 5/20

[58] Field of Search .................... 307/233, 271, 295; 328/138, 140

[56] References Cited

UNITED STATES PATENTS

| | | | |
|---|---|---|---|
| 3,099,800 | 7/1963 | Vinson et al. | 328/138 |
| 3,461,392 | 8/1969 | Hughes et al. | 307/271 |
| 3,502,904 | 3/1970 | Bordonaro | 307/233 |
| 3,581,217 | 5/1971 | Issacs | 307/233 |
| 3,591,859 | 7/1971 | Boyd et al. | 307/233 |

*Primary Examiner*—Stanley D. Miller, Jr.
*Attorney*—John F. Ahern et al.

[57] ABSTRACT

An electronic frequency-to-voltage converter employs a retriggerable second timing circuit for detecting a monitored predetermined frequency input slightly below a specific rated frequency. The second timing circuit is interconnected with a main timing circuit through digital logic circuitry and overrides the main timer when the input exceeds the predetermined frequency and also causes the converter output voltage to abruptly rise to, and remain at, a voltage amplitude corresponding to the rated frequency input. Noise interference is eliminated by interconnecting a binary counter in the circuit for counting up to a predetermined number of input pulses which may include noise, during the timing cycle of the second timing circuit. The overriding function of the second timing circuit is thereby delayed until the predetermined number of pulses have occurred during the timing cycle of the second timing circuit.

18 Claims, 30 Drawing Figures

FREQUENCY-TO-VOLTAGE CONVERTER HAVING HIGH NOISE IMMUNITY

Figure 1:
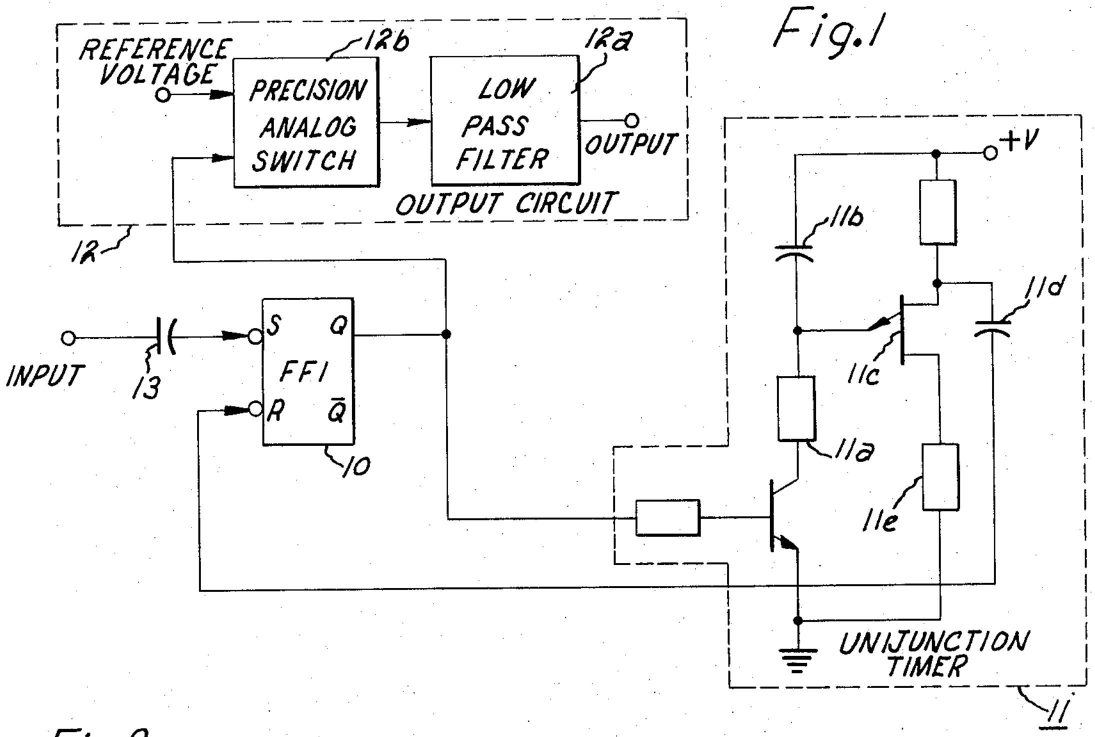

My invention relates to an all-electronic frequency-to-voltage converter having high immunity to noise interference, and in particular, to a converter whose output voltage abruptly rises to, and remains at a value corresponding to a rated input frequency when the input frequency exceeds a predetermined value slightly below the rated.

Frequency-to-voltage converters are used in many applications for monitoring and controlling various parameters such as the speed of rotating machines. The converter generally detects the frequency of a pulsed voltage waveform generated in the machine speed sensor and converts the repetition rate or frequency of the input voltage waveform to a DC voltage of magnitude directly proportional to frequency input.

In the prior art, a conventional electronic frequency-to-voltage (f/v) converter circuit consists of a flip-flop, a precision unijunction transistor timing circuit and an output circuit connected to the output of the flip-flop and including a low pass filter for obtaining a smooth DC output. The flip-flop is set by the input frequency signal and is reset by the unijunction timing circuit at the end of its timing cycle. This prior art f/v converter has good noise immunity. However, when operating at, or above an input frequency corresponding to a rated frequency such as the maximum rated overspeed of the rotating machine, it fails to respond to every input frequency pulse, and just above the maximum rated overspeed point, the converter DC output suddenly decreases to one-half of the correct value, which can have disasterous effects in the control system and for the rotating machine.

Any circuit which can prevent the above sudden drop in converter output and maintain the output at the maximum value must be responsive to input triggering pulses that occur while the flip-flop is set, indicating that the next input has already occurred before the unijunction circuit is timed out. By itself, however, such a circuit will obliterate the noise immunity of the original circuit since it is capable of accepting an extra input at any time which will force the converter output toward the maximum voltage level.

Therefore, one of the principal objects of my invention is to provide an improved all-electronic frequency-to-voltage converter whose output remains at a maximum value whenever the frequency input signal exceeds a predetermined frequency.

Another object of my invention is to provide the converter with high immunity to noise interference.

Briefly summarized, and in accordance with the objects of my invention, I provide an improved frequency-to-voltage converter having high noise immunity. The converter is of the all-electronic type and includes a first flip-flop having a set input connected to the input terminal of the converter and a reset input connected to the output of a main timing circuit which is a precision unijunction transistor timing circuit triggered from the output of the first flip-flop. The output of the first flip-flop determines the output voltage of the converter for frequency inputs less than a predetermined frequency which is slightly below a value corresponding to a maximum rated condition of the parameter being monitored. A second timing circuit consisting of a retriggerable monostable multivibrator has an input connected to the converter input terminal and a first output connected to digital logic circuitry for causing override of the main timer when the frequency of the input signal exceeds the predetermined lower frequency. The operation of the second timing circuit and digital logic circuitry causes the converter output voltage to abruptly rise to, and remain at a maximum value during the time interval wherein the input frequency exceeds the predetermined lower value. Noise interference occurring during the timing cycle of the second timing is eliminated by interconnecting a binary counter in the digital logic circuitry and having the counter be reset whenever the multivibrator has completed its timing cycle and is in its quiescent state. The override function of the second timer is thus delayed until the counter has counted a predetermined number of input pulses which may include both the frequency input and spurious or noise inputs while the second timer is still timing. In the preferred embodiment of my *f/v* converter, the digital logic circuitry includes two NAND gates interconnected with the binary counter, and a NOR logic gate. The NOR gate interconnects the output of the first flip-flop or the output of one of the NAND gates (connected to the output of the counter) to the output circuit of the converter.

Figure 2:
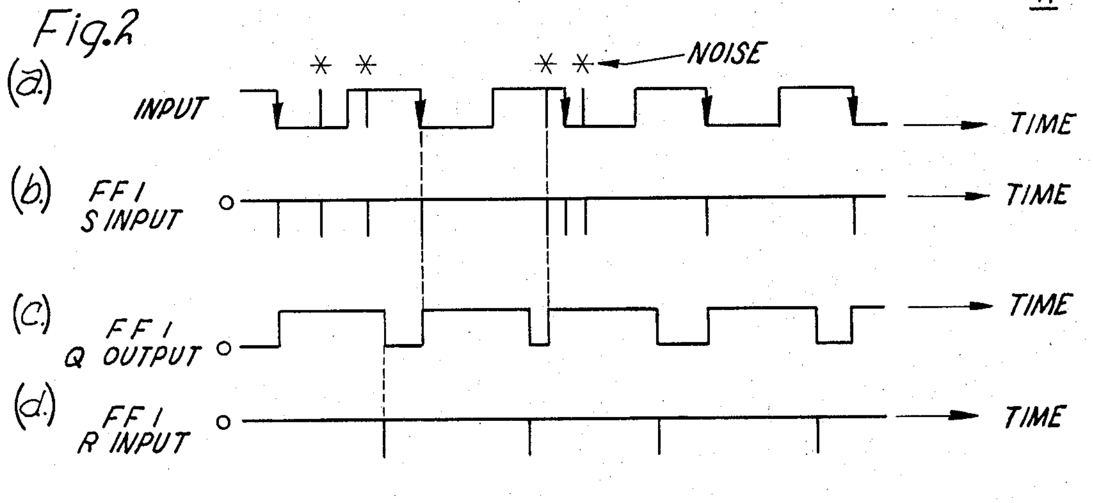
Figure 3:
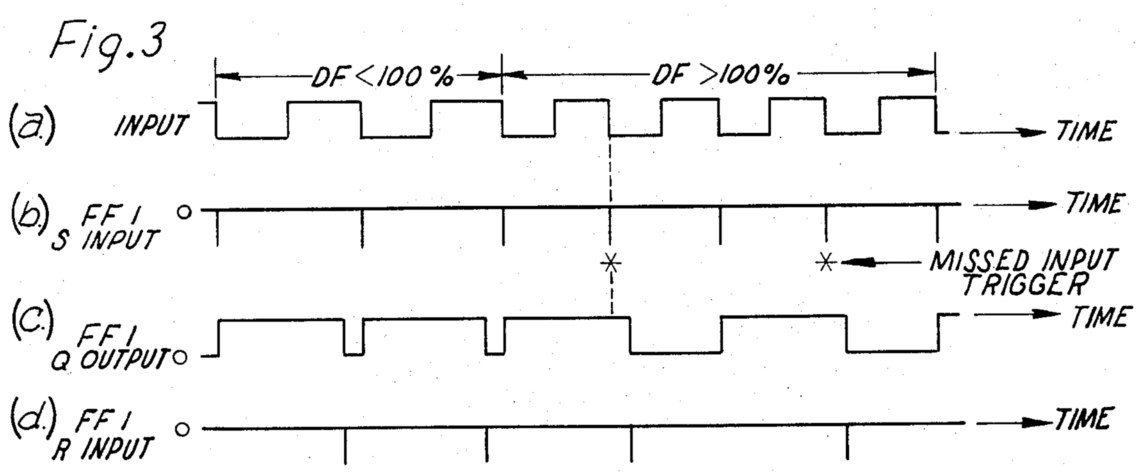
Figure 4:
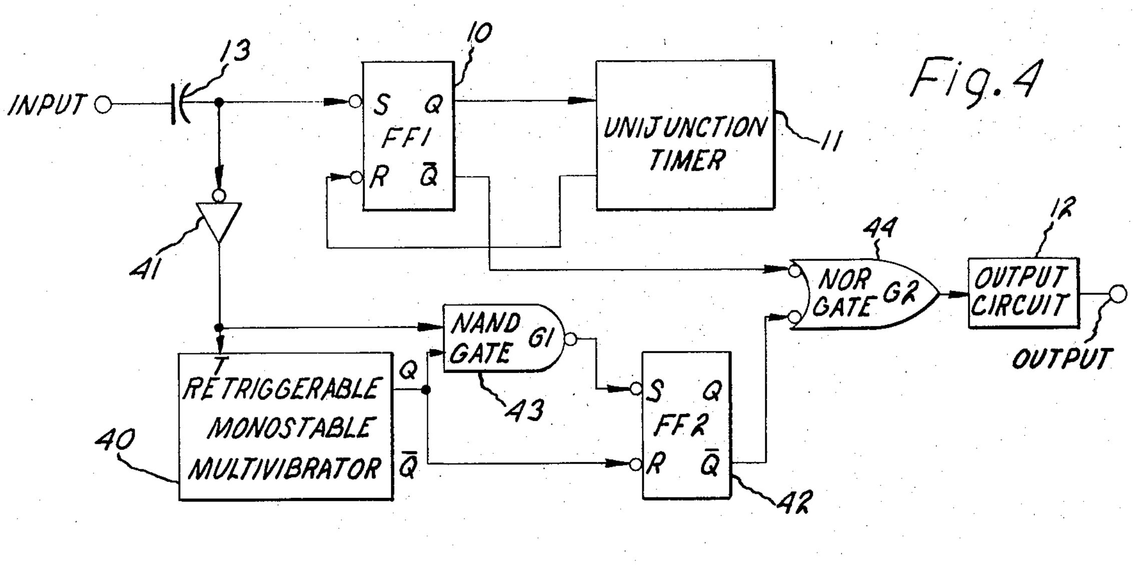
Figure 5:
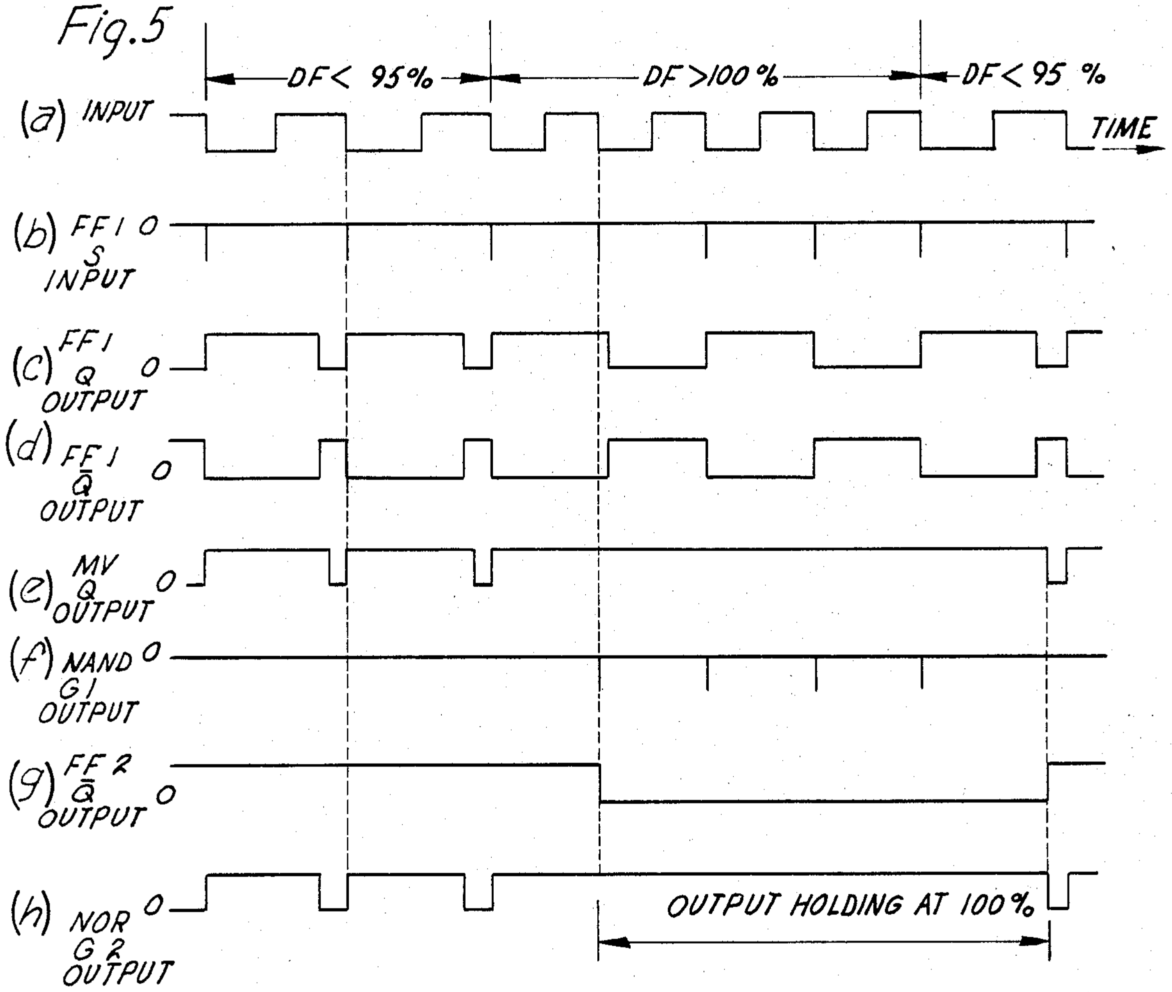
Figure 6:
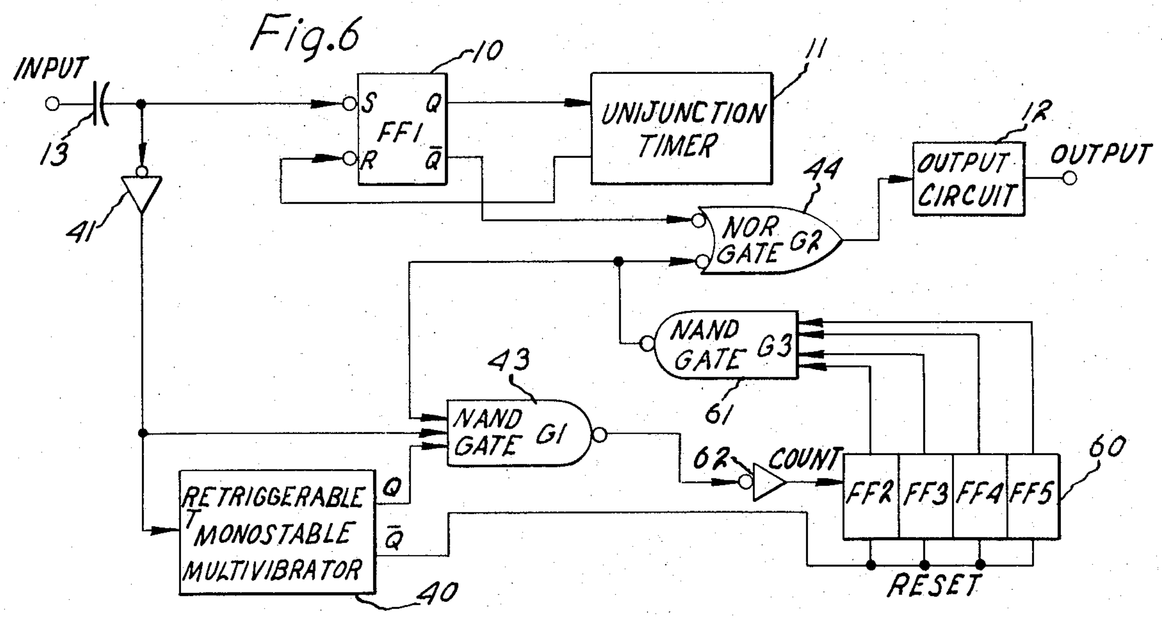
Figure 7:
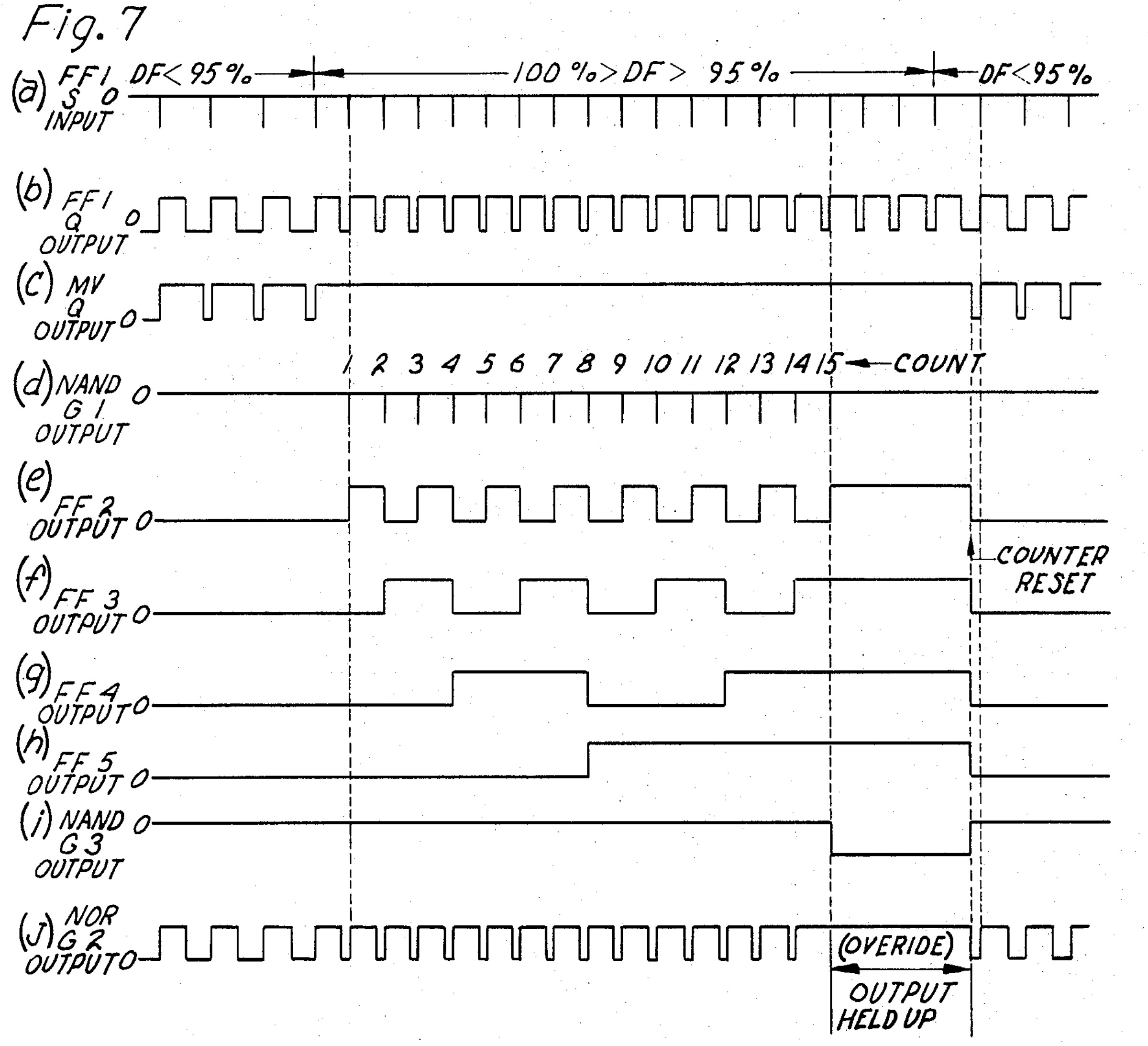
Figure 8:
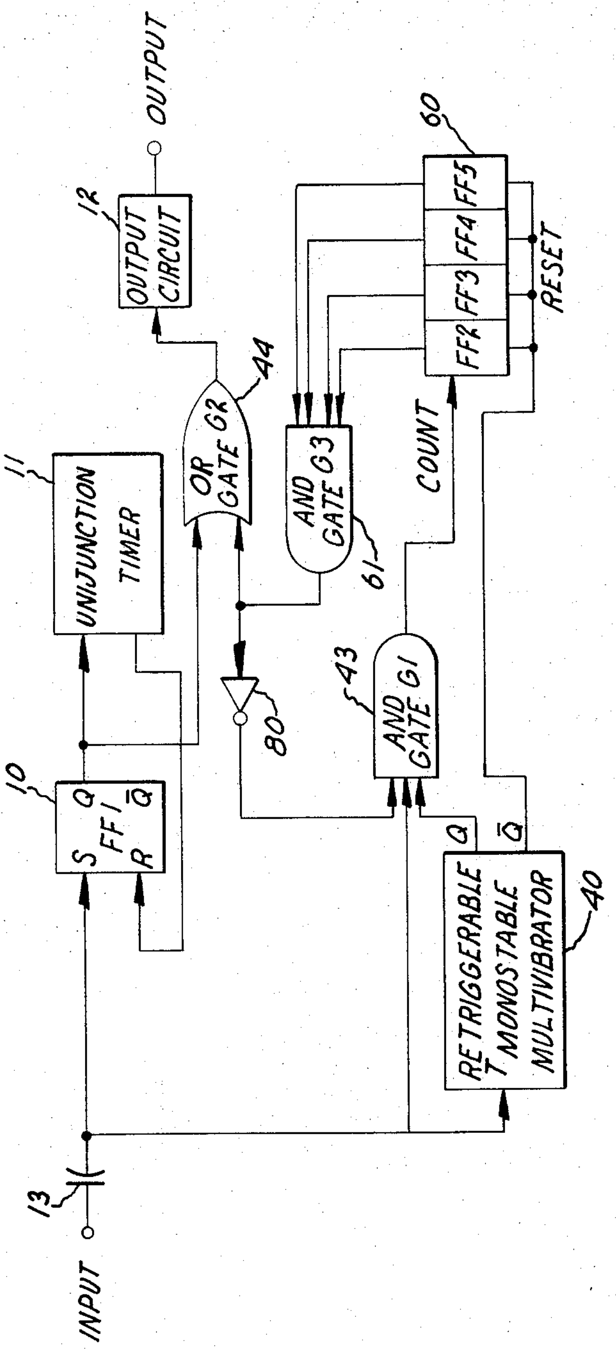

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein:

FIG. 1 is a partial schematic, partial block diagram, of a prior art frequency-to-voltage converter having high noise immunity;

FIGS. 2*a*, *b*, *c*, and *d* indicate voltage waveforms versus time of signals appearing at various points in the prior art converter illustrated in FIG. 1, and showing the effects of noise interference;

FIGS. 3*a*, *b*, *c* and *d* indicate waveforms versus time corresponding to the waveforms of FIGS. 2*a–d*, but showing the effects of operation of the converter at frequency inputs below and above a maximum rated frequency;

FIG. 4 is a block diagram of an *f/v* converter in accordance with my invention for providing override of the main timer at a particular input frequency slightly below the maximum rated value;

FIGS. 5*a*, *b*, *c*, *d*, *e*, *f*, *g* and *h* indicate voltage waveforms versus time of signals appearing at various points in my circuit of FIG. 4;

FIG. 6 is a block diagram of a preferred embodiment of my *f/v* converter for providing delayed override of the main timer;

FIGS. 7*a*, *b*, *c*, *d*, *e*, *f*, *g*, *h*, *i* and *j* indicate voltage waveforms versus time of signals appearing at various points in the circuit of FIG. 6; and FIG. 8 is a block diagram of the converter of FIG. 6 but using OR-AND logic circuitry instead of NOR-NAND logic.

Referring now in particular to FIG. 1, there is shown a conventional all-electronic, high noise immunity frequency-to-voltage converter which basically includes a flip-flop 10, a unijunction transistor timing circuit 11 and an output circuit 12 which includes a low pass filter 12*a* for providing smooth DC voltage output corresponding to the set-reset cycle outputs of flip-flop 10. The input signal to the *f/v* converter is generally a voltage of substantially square or exemplary pulsed waveform which has a repetition rate (frequency) directly proportional to the magnitude of the parameter being monitored by the converter. The *f/v* converter has application in any system wherein the magnitude of a paramater can be detected and developed into the above-described frequency-sensitive voltage waveform. As one typical, but by no means limiting, example of the use of the *f/v* converter, it finds wide application in monitoring the rotational speed of rotating machines such as electric motors, generators and steam turbines. The discussion herein will be limited to a steam turbine speed control system application for exemplary purposes only. Specifically, the *f/v* converter will be described as the component which provides the voltage control signal to the control system that regulates the steam turbine speed. Thus, the frequency of the input voltage square waveform (depicted in FIGS. 3*a* and 3*a*) applied to the input terminal of the *f/v* converter is directly proportional to the turbine speed.

An input coupling capacitor 13 is connected between the input terminal of the converter and the set(S) input of flip-flop 10 (designated FF1 in the figures). All the flip-flops utilized herein are of the conventional cross-coupled set-reset type. Capacitor 13 changes the input square or other pulsed waveform into a series of alternately negative and positive-going voltage spikes wherein the negative-going edges of the input square waveform cause all of the negative-going spikes illustrated in FIG. 3*b*, (and most of the spikes in FIG. 2*b*) and the positive-going edges cause positive-going spikes which are of no concern to the operation of the circuit. The sensed steam turbine speed is assumed to be constant with reference to the waveforms depicted in FIGS. 3*a*, *b*, *c*, *d* (in the portion designated DF<100 percent) and in all of FIGS. 2*a*, *b*, *c*, *d* and to correspond to approximately rated operating speed (i.e., 100 percent speed). The negative-going voltage spikes are supplied to the set (S) input of flip-flop 10 for triggering such flip-flop into its high state at the Q output thereof. The Q output of flip-flop 10 is connected to the input of a precision timing circuit 11 which in this specific embodiment is a unijunction transistor circuit. Thus, circuit 11 begins timing, that is, begins generation of its fixed time delay in response to the leading edge of each high state at the Q output of flip-flop 10.

The unijunction timer 11, hereinafter described as the main timer, is a conventional circuit which generates a predetermined, constant time delay determined by the resistance and capacitance values of resistor 11a and capacitor 11*b* in the unijunction transistor 11*c* emitter circuit. The timer is preferably of a high precision type, and for this purpose a temperature compensating resistor 11*e* is utilized in the base 1 circuit thereof. The negative output of the timing circuit 11 is supplied through coupling capacitor 11*d* to the reset (R) input of flip-flop 10. The output coupling capacitor 11*d* responds to the end of each timing cycle and develops the negative-going voltage spikes shown in FIGS. 2*d* and 3*d*. Each time-delayed voltage spike at the output end of capacitor 11*d* thus triggers the flip-flop Q output to its reset or low state. Flip-flop 10 therefore develops equal duration high states at the Q output thereof although the low states are generally variable as will be described hereinafter and illustrated in the waveform of FIGS. 2*c* and 3*c*. The use of the little circles at the S and R inputs to flip-flop 10 and at inputs or outputs of other devices in FIGS. 4, 6, 8 indicates a polarity reversal of the signal therethrough and the point which has the negative polarity signal.

The Q output of flip-flop 10 is also connected to an input of a precision analog switch 12*b* in the output circuit 12. Switch 12*b* can be a transistor having very low offset voltage which converts the flip-flop output to pulses having a precise constant amplitude. Switch 12*b* is necessary since the flip-flop high state output amplitude may not always remain constant. A second input to switch 12*b* is connected to a stable DC reference voltage, and each leading and trailing edge of the flip-flop state output respectively switches the reference voltage into and out of the transistor circuit. Low pass filter 12*a* smooths the pulsed output of switch 12*b* and thereby provides a DC average of the flip-flop variable high state-low state output duration multiplied by the fixed reference voltage magnitude.

It will be assumed that the repetition rate (frequency) of the square wave voltage waveform output of the turbine speed sensor is linear with turbine speed. In the case of the specific turbine speed control to be described herein, the turbine will normally be operated at its rated operating speed (i.e., 100 percent machine speed) and proportional control of speed will also be required when the turbine is operating above its rated operating speed, i.e., in an overspeed condition. Therefore, the output of the *f/v* converter must be linearly proportional to speed up to a specific overspeed, at which all overspeed protective devices will have become actuated. At still higher speeds, proportionality is no longer required, but the *f/v* converter output must remain fixed at its maximum value.

The input square waveform depicted in FIG. 2*a* will be assumed to represent operation at rated operating speed. At such speed, and in the absence of any noise output, the duty factor (DF) of the flip-flop output (i.e., ratio of the duration of the high state to the repetition period) will be somewhat below 100 percent as depicted in the first and fourth complete cycles in FIG. 2*c*. When overspeed occurs, the duty factor of the flip-flop output will increase up to 100 percent, which corresponds to the end of the linear speed range described above. At higher speeds, means must be employed (to be described later) to sustain the output at the value corresponding to 100 percent duty factor.

The *f/v* converter illustrated in FIG. 1 has very good noise immunity when operating above 50 percent duty factor (i.e., the flip-flop 10 output is in its high state for a longer interval than in its low state) since extraneous noise inputs will either have no effect on the flip-flop after it is in its set (high output) state, or will cause a unijunction timing cycle to be merely displaced with no change in the average output as will now be described with reference to FIGS. 2*a–d*. Extraneous or noise inputs are depicted as superimposed on the input square wave voltage waveform in FIG. 2*a* as spikes identified by asterisks. It is clearly evident that the first two and fourth noise spikes have no effect on the flip-flop since they occur during its high state output after it has already been triggered into operation. However, the third noise spike occurs at a time when flip-flop 10 would normally be in its low state output and such noise spike therefore triggers flip-flop 10 into its high state at a time earlier than would occur from the next following negative-going edge of the input signal waveform. But, this earlier triggering of flip-flop 10 merely causes the unijunction timing circuit to begin timing at an earlier interval and therefore merely displaces the same duration high state output of the flip-flop to the left in FIG. 2*c*. This results in the low state of the second cycle being shorter, and the low state of the third cycle being proportionally longer by such time displacement with the following (fourth) cycle again being identical to the first cycle in the absence of any further noise spikes.

Although the FIG. 1 converter has very good noise immunity, its operation becomes unacceptable when the input frequency exceeds the value which produces 100 percent duty factor (DF). The converter then does not respond to every input pulse as will now be described with reference to the waveforms depicted in FIGS. 3*a–d*. The first two cycles of the converter input waveform depicted in FIG. 3*a* correspond to turbine normal operating speed with duty factor less than 100 percent, and the following four cycles correspond to an overspeed greater than the speed corresponding to a 100 percent duty factor. As in the case of FIG. 2*b*, each negative-going edge of the input waveform generates a triggering voltage spike which is supplied to the set input of flip-flop 10. Thus, the latter four triggering spikes depicted in FIG. 3*b* occur at a greater frequency with respect to the first two spikes. Flip-flop 10 responds faithfully to the first two cycles of the input waveform in the same manner as with respect to the first and fourth cycles in FIG. 2*c*. With respect to the last four cycles of the input waveform depicted in FIG. 3*a*, it can be seen that alternate spikes of the four flip-flop triggering spikes (indicated by asterisks in FIG. 3*b*) occur during the timing cycle of unijunction timer 11 when flip-flop 10 is therefore still in its high state output. Thus, these two triggering spikes are not detected by flip-flop 10 which remains reset during every other cycle of the input. This causes a reduction of the duty factor of the flip-flop output to nearly 50 percent as seen in FIG. 3*c*. Thus, during the interval of excessive speed when the duty factor of the flip-flop 10 output should be greater than 100 percent, if this was possible, in actuality the duty factor and resultant DC signal at the output of low pass filter 12*a* suddenly decreases to approximately 50 percent of the maximum magnitude possible with a duty factor of 100 percent. This sudden decrease in the converter output to one half, when the speed is actually above its rated speed, can have disastrous results since the control system now sees a control signal indicating a turbine speed considerably less than rated speed and therefore calls for opening of the turbine steam valves whereas the actual excessively high speed should dictate such valves remain closed and all other possible precautions taken to reduce the speed.

Therefore, an *f/v* converter which corrects the above condition and maintains the output of the *f/v* converter at a DC voltage corresponding to the maximum proportional overspeed must be responsive to input trigger signals that occur while flip-flop 10 is in its set state, indicating that the next input has already occurred before the unijunction circuit has timed out. By itself, however, such converter will obliterate the desired noise immunity inherent in the converter depicted in FIG. 1 since it is now capable of accepting an extra (noise) input at any time and this noise will force the output toward the 100 percent duty factor point. Therefore, my invention is directed to an *f/v* converter which corrects the failure of the FIG. 1 circuit when the steam turbine is operating at or above the speed corresponding to a duty factor above 100 percent while retaining its advantageous feature of high noise immunity.

Referring now to FIG. 4, there is shown an *f/v* converter in accordance with my invention which provides override of the unijunction timing circuit 11 whenever the duty factor exceeds a predetermined value approaching 100 percent. As a typical example, the circuit depicted in FIG. 4 detects a duty factor of 95 percent and such detection is obtained in a separte timing circuit consisting of a conventional retriggerable monostable multivibrator 40 having an input connected to the input terminal of the converter through coupling capacitor 13 and an inverter 41 for inverting the polarity of the triggering voltage spike. The timing duration of the multivibrator is always greater than the timing duration of the unijunction timer. Thus, the second timing circuit 40 detects the approach to 100 percent duty factor before the main timer (unijunction timer 11) reaches that 100 percent DF point. The operation of timer 40 at 95 percent duty factor allows it to be of much lower stability than the main unijunction timer 11 and the retriggerable monostable multivibrator circuit is ideally suited for the purpose. The retriggerable monostable multivibrator is a type which has its timing restarted by any input event, even if it occurs while timing is still in process. Therefore, its Q output remains continuously in the high state (i.e., multivibrator 40 remains triggered) when the input duty factor exceeds the 95 percent point about which the device parameters have been designed. When this condition occurs, the output of the main timer must be overridden to prevent undesired operation of the converter. This overriding function is accomplished by utilizing a second flip-flop 42 (depicted as FF2) which has the set (S) input thereof connected to the output of NAND gate 43 (designated NAND gate G1) which in turn has a first input connected to the Q output of timer 40. NAND gate G1 has a second input connected to the output of inverter 41 and is a positive logic device in that the output thereof switches to the low state only when both inputs are in a high state. As stated above with reference to flip-flop FFL, the positive logic operation of NAND gate G1 is indicated by the little circle at the output end thereof, which also indicates that it is a polarity inverting digital logic device. The reset input of FF2 is connected to the Q output of the 95 percent timer 40. Flip-flop FF2 thus sets and remains set whenever the duty factor exceeds 95 percent (the 95 percent timer is being held on by retriggering) and resets and remains reset when the duty factor decreases below 95 percent (the 95 percent timer is off). The complementary $\overline{Q}$ outputs of FF2 and the main timer FF1 are connected to inputs of a NOR logic gate 44 (designated NOR gate G2 in the FIGURE) and result in the output thereof switching to its high state and remaining there when the duty factor exceeds 95 percent. The output of NOR gate G2 is connected to the input of the output circuit 12. Thus, when the duty factor exceeds the predetermined 95 percent level established by the retriggerable (MV) second timer 40, its Q output remains high and negative polarity voltage spikes now appear at the output of NAND gate G1 in response to the negative-going edges of the input waveform as depicted in the waveforms of FIGS. 5*a*, 5*e* and 5*f*. Flip-flop FF2 has its $\overline{Q}$ output triggered into its low state by the first negative voltage spike appearing at the output of NAND gate G1 and remains in such low state until reset to its high state by the timing out of the multivibrator (MV) 40 as seen in FIG. 5*g*. Finally, as can be seen in FIGS. 5*d*, 5*g* and 5*h*, the output of NOR gate G2 in its high state whenever either of the $\overline{Q}$ outputs of the two flip-flops are in a low state. Thus, with a turbine speed sufficiently below a specific overspeed such that the duty factor is less than 95 percent, the NOR gate G2 output faithfully follows the flip-flop FF1 Q output and the converter is thus controlled only by the main timer 11. When the duty factor exceeds 95 percent, the NOR gate G2 output is controlled by the retriggerable second timer 40 and switches to and remains in its high state until the 95 percent timer times out. Thus, when the duty factor exceeds 95 percent, the converter output signal abruptly rises to its maximum value (i.e., 100 percent) to thereby obtain maximum control action for reducing turbine speed. Although the second timer 40 gains control of the converter output when DF>95 percent, the higher duty factor portion of the waveforms in FIGS. 4*a* –*h* is illustrated for DF>100 percent to again indicate the alternately missed FF1 output pulses and resultant abrupt drop in FF1 duty factor to 50 percent as in the case of FIG. 3*c*. If the duty factor was between 95 and 100 percent, no FFL pulses would be missed, the maximum converter output would still be achieved by the action of FF2. Thus, the 100 percent duty factor problem associated with the main timer 11 in FIG. 1 has been overcome by the use of the second timer and digital circuitry associated therewith.

The *f/v* converter illustrated in FIG. 4 is satisfactory in applications wherein noise input is not present. However, any noise input that does occur while the retriggerable monostable multivibrator 40 is timing will set flip-flop FF2 and thereby develop a maximum output of the converter for one cycle of the multivibrator. The effect of this is intolerable since the noise input is likely to occur in bursts and thereby maintain the converter output signal at its maximum (100 percent) magnitude at turbine speeds less than the speed associated with a duty factor of 95 percent. Thus, to prevent premature override of the main timer by a short duration noise input, the delayed override circuit illustrated in FIG. 6 is provided as a second and preferred embodiment of my invention. Referring now to FIG. 6, the delayed override feature is obtained by replacing flip-flop FF2 in FIG. 4 with a multi-state binary counter 60 and a second positive logic NAND gate 61 (designated NAND gate G3) having its inputs connected to the outputs of the binary counter 60. The output of NAND gate G3 is connected to an input of NOR gate G2 as well as to an input of NAND gate G1. A second inverter 62 is connected between the output of NAND gate G1 and the count input of binary counter 60 for obtaining the positive polarity input if this is required for the particular counter being used. Counter 60 is reset whenever retriggerable second timer 40 times out. Since the counter being depicted in FIG. 6 is reset by a high logic signal, its reset is connected to the Q output of timer 40. In other respects, the circuit of FIG. 6 is the same as in FIG. 4.

Referring now to the waveforms in FIGS. 7*a–j* which indicate the signals appearing at various points in the FIG. 6 circuit, the negative polarity voltage spikes depicted in FIG. 7*a* represent the input frequency signal applied to the set input of flip-flop FF1 to trigger the Q output thereof into its high state as depicted in FIG. 7*b*. The first four cycles of the input waveform are assumed to be for a turbine speed corresponding to a duty factor less than 95 percent, the next 18 cycles are assumed to be for a speed corresponding to a duty factor greater than 95 percent but less than 100 percent, and the last three cycles are again at a duty factor of less than 95 percent. Since each of the input waveform cycles corresponds to a duty factor less than 100 percent, the timing cycles of the main timer 11 will always be completed and thus no input triggers are missed by the flip-flop FF1. As noted earlier, the Q output of FF1 remains in its high state (and the $\overline{Q}$ output remains in its low state) for equal intervals but at a higher frequency when the duty factor is greater than 95 percent as compared to when the duty factor is less than 95 percent. The retriggerable multivibrator (MV) Q output is the same as in the FIG. 4 circuit in that it times out and becomes retriggered with each input waveform positive polarity voltage spike for DF < 95 percent and remains in its high state when DF>95 percent since it then cannot time out before the next triggering input occurs as seen in FIG. 7*c*. NAND gate G1 also operates in the same manner in the FIG. 6 circuit as in the FIG. 4 circuit in that the output thereof produces negative polarity voltage spikes only during the period when the multivibrator Q output remains in its high state in the duty factor range greater than 95 percent as seen in FIG. 7*d*.

The distinction between the instantaneous and delayed override circuits of FIGS. 4 and 6 becomes evident in the binary counter outputs illustrated in FIGS. 7*e*, *f*, *g*, and *h* when compared with the FF2 $\overline{Q}$ output in FIG. 5*g*. Binary counter 60 in the illustrated embodiment employs four flip-flop stages designated FF2, FF3, FF4 and FF5. Counter 60 counts the input waveform cycles appearing as positive polarity voltage spikes after polarity reversal through inverter 62 while the retriggerable timer 40 Q output is in its high state. The use of four stages in the binary counter permits an input of 15 counts before the counter reaches a maximum count. Counter 60 is reset to zero whenever the multivibrator 40 Q output switches to the low state thereby having the complementary $\overline{Q}$ output, which is connected to the reset input of the counter switching to its high state. Thus, the input to my *f/v* converter, which may be a combination of normal speed signal pulse cycles and noise interference, must occur closer together than the timing cycle of the multivibrator 40 in order for the count to accumulate to its maximum. When the count reaches 15, NAND gate G3 is enabled and switches to its low state output which turns off the input to counter 60 by means of NAND gate G1 thereby sustaining the counter in its 15 count state. These conditions are indicated in waveform FIGS. 7*e*, *f*, *g*, *h* and *i*. The output of NAND gate G3 is also applied to NOR gate G2 and therefore at the time counter 60 reaches its count of 15, the output of NOR gate G2 remains in its high state and thereby overrides the main timer and holds the output of the converter at 100 percent. It should be observed that if the duty factor is greater than 100 percent, one or more cycles in the NOR gate G2 output may be missed as in the case of the FF1 output in FIG. 3*c*. However, even a total of 15 counts lasts for too short a time interval for the effect thereof to get through the low pass filter in output circuit 12 to actuate the slow operating turbine inlet steam valve before NAND gate G3 has its output switched to the low state. (The frequency of the input waveform corresponding to rated turbine speed is in the kilohertz range and therefore only about 10 milliseconds are required to actuate the override function).

The noise immunity of the FIG. 6 converter is very good and is not strongly dependent on the counter capacity. Thus, if the output of the second stage (FF3) of the counter is omitted to allow use of a 3-input gate for G3, the resultant 13 count still provides good noise immunity. In such case, for noise interference occurring near the converter operating frequency, seven spurious inputs or more than four pairs of such inputs at any spacing are required to actuate the override circuit. However, if the frequency of the noise interference is only slightly lower than the converter operating frequency, the interference ceases to have any effect on the DC output of the converter, such lower frequency being the one which allows the multivibrator to time out just before the override count reaches 13. The limit involves the duty factor of the multivibrator at the frequency of the normal input. In an application where the duty factor at normal operating speed is 75 percent, the result is immunity to any interfering frequency below 91.2 percent of the normal input frequency. Raising the count to 15 with the connection indicated in FIG. 6 only raises the interfering immunity frequency to 92.4 percent. A three-state counter with a capacity of seven counts is still immune to interference up to 84 percent of the normal frequency. Such three-stage counter ignores three separate pulses or two closely spaced pulse pairs at any separation because the maximum count obtainable is six before the multivibrator times out.

A specific embodiment of the FIG. 6 circuit utilizes integrated circuits of the following TTL type: retriggerable monostable multivibrator 40 is a 74122, the four-stage binary counter 60 is a 7493, flip-flop 10 and inverters 41, 62 utilize the four 2-input NAND gates in a TTL type 7400. In the case wherein only a count of 13 is utilized, this permits the use of a TTL type 7410 integrated circuit which consists of three 3-input gates, two being used for NAND gates G1 and G3 and the third gate functioning as a negative logic NOR for gate G2.

In the hereinabove described circuits, NOR and NAND logic circuitry is preferably utilized since such devices are readily available and conventionally used in TTL logic circuits. However, OR and AND logic devices can also be used, and FIG. 8 illustrates the manner in which FIG. 6 is changed to accommodate the OR and AND logic devices. It can be seen that the distinctions between the two circuits are that the FF1 flip-flop, AND gate G1, OR gate G2 and AND gate G3 are not of the polarity inverting type in FIG. 8 as in FIG. 6. Further, an inverter is not required at the input to the multivibrator and AND gate G1, nor from the output of AND gate G1 to the count input of the binary counter. However, in FIG. 8 an inverter 80 is required from the output of AND gate G3 to the input of AND gate G1 and the input to OR gate G2 from flip-flop FF1 is obtained from the Q output instead of the $\bar{Q}$ output as in FIG. 6. In all other respects the circuits are the same and function in the same manner.

It is apparent from the foregoing that my invention attains the objectives set forth in that it provides an all-electronic frequency-to-voltage converter which has operating characteristics such that whenever the frequency input signal thereto exceeds a predetermined frequency established by a retriggerable monostable multivibrator, an overriding maximum output of the converter is developed for providing a control signal that will regulate the parameter being controlled to a value corresponding to a lower frequency input signal. For purposes of providing noise immunity to the converter, a binary counter and associated digital logic circuitry is utilized for delaying the override of the main timer in the converter by the multivibrator for a particular number of input pulse counts during a timing cycle of the multivibrator. My converter provides the excellent noise immunity described hereinabove for input signal frequencies corresponding to a duty factor of the main timer flip-flop (FF1) which is 50 percent or greater. At lower input frequencies, interference can inject a complete extra unijunction time cycle between its normal ones, thereby raising the converter output. Therefore, the control system should be designed about a normal duty factor of approximately 75 percent. However, as typically used in speed feedback control systems operating at a fixed normal frequency, the increase in output that interference can cause at low speeds is in the safe direction and is of little importance.

Having described nondelayed and delayed override embodiments of my frequency-to-voltage converter, it is believed obvious that other timing circuits may be employed for the main timer since the unijunction transistor embodiment described herein is merely one example. It is, therefore, to be understood that changes may be made in the particular embodiment of my invention described which are within the full intended scope of the invention as defined by the following claims.

What is claimed as new and desired to be secured by Leters Patent of the United States is:

1. An improved frequency-to-voltage converter comprising a first flip-flop having a set input connected to an input terminal of the converter to which is applied a pulsed voltage waveform having a frequency proportional to the value of a parameter being monitored, a first timing circuit having an input connected to a first output of said first flip-flop, and having an output connected to a reset input of said first flip-flop, a complementary second output of said first flip-flop connected to an output circuit including filter means for smoothing the flip-flop output to an average DC voltage level proportional to the frequency of the input pulsed voltage waveform, the improvement comprising a retriggerable second timing circuit for detecting the parameter value at a predetermined magnitude slightly lower than a rated value thereof, said second timing circuit having an input connected to the input terminal of the converter whereby said second timing circuit is retriggered and remains in its timing state during the time interval in which the value of the monitored parameters exceeds the predetermined value, and first digital logic circuit means interconnected with the second output of said first flip-flop, and with the input terminal of the converter, and with a first output of said second timing circuit and said output circuit for overriding the output of said first flip-flop during the time interval in which the value of the monitored parameter exceeds the predetermined value.

2. The improved frequency-to-voltage converter set forth in claim 1 wherein said first digital logic circuit means having a first input connected to the second output of said first flip-flop, a second input connected to the input terminal of the converter, and a third input connected to the first output of said second timing circuit, said first digital logic circuit means having an output connected to an input of said output circuit.

3. The improved frequency-to-voltage converter set forth in claim 2 wherein the output of said first digital logic circuit means is directly connected to the input of said output circuit and the second output of said first flip-flop is indirectly connected thereto.

4. The imrpoved frequency-to-voltage converter set forth in claim 1 wherein the timing duration of said second timing circuit is greater than the timing duration of said first timing circuit.

5. The improved frequency-to-voltage converter set forth in claim 2 wherein said first digital logic circuit means comprises a first NAND logic gate having a first input connected to the input terminal of the converter thereby forming the second input of said first digital logic circuit means, said first NAND gate having a second input connected to the first output of said second timing circuit thereby forming the third input of said first digital logic circuit means, said first NAND gate providing a pulsed output in response to the pulsed voltage waveform applied to the input terminal of the converter only during the timing interval of said second timing circuit when the value of the monitored parameter exceeds the predetermined value.

6. The improved frequency-to-voltage converter set forth in claim 5 wherein said first digital logic circuit means further comprises a second flip-flop having a set input connected to an output of said first NAND gate and having a reset input connected to the first output of said second timing circuit thereby further forming the third input of said first digital logic circuit means, said second flip-flop switching its output to the set state thereof in response to the first pulsed output of said first NAND gate during the timing interval of said second timing circuit when the value of the monitored parameter exceeds the predetermined value and switching its output to the reset state at the end of the corresponding timing interval of said second timing circuit.

7. The improved frequency-to-voltage converter set forth in claim 6 wherein said first digital logic circuit means further comprises a NOR logic gate having a first input connected to the second output of said first flip-flop thereby forming the first input of said first digital logic circuit means, a second input of said NOR gate connected to an output of said second flip-flop, an output of said NOR gate connected to an input of said output circuit thereby forming the output of said first digital logic circuit means, output of said NOR gate corresponding to an alternately set and reset output of said first flip-flop during the time interval in which the value of the monitored parameter is less than the predetermined value, the output of said NOR gate being switched to and remaining in its high state thereby overriding the output of said first flip-flop during the time interval in which the value of the monitored parameter exceeds the predetermined value and said second timing circuit remains in its timing state.

8. The improved frequency-to-voltage converter set forth in claim 5 and further comprising a capacitor having an input connected to the input termianl of the converter and having an output connected to each of the set input of said first flip-flop, the input of said second timing circuit and the first input of said first NAND gate for converting the input pulsed voltage waveform to corresponding voltage spikes for triggering the timing of said second timing circuit and for providing like voltage spikes at the output of said first NAND gate during the timing interval of said second timing circuit when the value of the monitored parameter exceeds the predetermined value.

9. The improved frequency-to-voltage converter set forth in claim 8 and further comprising an inverter having an input connected to the output of said capacitor and an output connected to each of said second timing circuit and the first input of said first NAND gage for inverting the polarity of the voltage spikes.

10. The improved frequency-to-voltage converter set forth in claim 1 wherein said first timing circuit is a unijunction transistor timing circuit.

11. The improved frequency-to-voltage converter set forth in claim 1 wherein said second timing circuit is a retriggerable monostable multivibrator.

12. The improved frequency-to-voltage converter set forth in claim 7 wherein said output circuit further includes a precision analog switch having a first input connected to the output of said NOR gate and a second input connected to a stable reference voltage source, output of said precision analog switch connected to an input of said filter means.

13. The improved frequency-to-voltage converter set forth in claim 1 wherein the filter means in said output circuit is a low pass filter.

14. The imrpoved frequency-to-voltage converter set forth in claim 1 and further comprising second digital logic circuit means interconnected with an output of said second timing circuit and with said first digital logic circuit means for delaying the overriding function established by said first digital logic circuit means and said second timing circuit until a predetermined number of voltage pulses have been applied to the input terminal of the converter and which may include a combination of the pulsed voltage waveform having frequency proportional to the monitored parameter as well as undesured noise undesired thereby obtain a high noise immunity frequency-to-voltage converter.

15. The improved frequency-to-voltage converter having high noise immunity set forth in claim 14 wherein said second digital logic circuit means comprises a multi-stage binary counter having a reset input connected to an output of said second timing circuit whereby said binary counter is reset whenever said second timing circuit completes a timing cycle, and a second NAND logic gate having inputs connected to outputs of said binary counter and having an output connected to inputs of said first digital logic circuit means.

16. The improved frequency-to-voltage converter having high noise immunity set forth in claim 15 wherein said first digital logic circuit means comprises a first NAND logic gate having a first input connected to the first output of said second timing circuit and a second input connected to the input terminal of the converter and a third input connected to the output of said second NAND gate, output of said first NAND gate connected to a count input of said multi-stage binary counter, and a NOR logic gate having a first input connected to the complementary second output of said first flip-flop and having a second input connected to the output of said second NAND gate and having an output connected to an input of said output circuit whereby the overriding function is delayed until a maximum count has been established in said binary counter to thereby provide the high noise immunity.

17. The improved frequency-to-voltage converter having high noise immunity set forth in claim 16 and further comprising an inverter having an input connected to an output of said first NAND gate and an output connected to the count input of said binary counter for reversing the polarity of voltage pulses at the output of said first NAND gate.

18. The improved frequency-to-voltage converter having high noise immunity set forth in claim 14 wherein said first digital logic circuit means comprises a first AND logic gate having a first input connected to the the first output of said second timing circuit and having a second input connected to the input terminal of the converter, and an OR logic gate having a first input connected to the first output of said first flip-flop and having an output connected to an input of said output circuit, said second digital logic circuit means comprises a binary counter having a count input connected to an output of said first AND gate and having a reset input connected to a complementary second output of said second timing circuit, a second AND gate having inputs connected to outputs of said binary counter and an output connected to a second input of said OR gate, and an inverter having an input connected to the output of said second AND gate and an output connected to a third input of said first AND gate.

* * * * *